United States Patent
Ellenberger

(10) Patent No.: US 6,802,673 B1
(45) Date of Patent: Oct. 12, 2004

(54) TUNNEL BORING WITH FOAMED COMPOSITION

(75) Inventor: Peter Ellenberger, Feldmeilen (CH)

(73) Assignee: MBT Holding AG, Zurich (CH)

( * ) Notice: Subject to any disclaimer, the term of this patent is extended or adjusted under 35 U.S.C. 154(b) by 43 days.

(21) Appl. No.: 10/049,367

(22) PCT Filed: Jun. 28, 2000

(86) PCT No.: PCT/EP00/05991
§ 371 (c)(1),
(2), (4) Date: May 3, 2002

(87) PCT Pub. No.: WO01/12952
PCT Pub. Date: Feb. 22, 2001

(30) Foreign Application Priority Data

Aug. 12, 1999 (GB) ............................................. 9918992

(51) Int. Cl.$^7$ .................................................. E21D 9/00
(52) U.S. Cl. ........................... 405/138; 175/65; 175/69; 507/117; 507/135
(58) Field of Search ................................ 507/117, 134, 507/135; 405/138, 139, 140, 141, 142, 143, 144, 145, 146, 147; 175/69, 65

(56) References Cited

U.S. PATENT DOCUMENTS

| | | | |
|---|---|---|---|
| 3,215,200 A | | 11/1965 | Kirkpatrick |
| 4,249,948 A | * | 2/1981 | Okada et al. ................ 106/678 |
| 5,180,252 A | | 1/1993 | Tanaka et al. |
| 5,250,578 A | * | 10/1993 | Cornwell ..................... 106/122 |
| 5,803,665 A | * | 9/1998 | Stephens ..................... 405/146 |
| 6,287,052 B1 | * | 9/2001 | Basset et al. ................ 405/138 |
| 6,485,233 B1 | * | 11/2002 | Ellenberger ................. 405/141 |

FOREIGN PATENT DOCUMENTS

| | | |
|---|---|---|
| GB | 808730 | 2/1959 |
| GB | 1003318 | 9/1965 |
| GB | 1570329 | 6/1980 |
| JP | 59015476 | 1/1984 |
| WO | WO 99/18330 | 4/1999 |

OTHER PUBLICATIONS

"Concrete: Introduction" http://www.olemiss.edu/courses/engr313/engr314/introduction.html undated.*

* cited by examiner

Primary Examiner—John Kreck
(74) Attorney, Agent, or Firm—Norris McLaughlin & Marcus PA

(57) ABSTRACT

A process of boring a tunnel using an earth-pressure balance shield boring tunnelling machine having a cutting head, an excavation chamber for soil removed by boring and conveying means for removal of said soil from the excavation chamber; wherein there is injected into a stratum being bored at the cutting head a foamed aqueous solution, characterized in that (a) the aqueous solution contains two essential components which are (i) a sulphate- or sulphonate-containing anionic susfactant, and (ii) β-naphthalene sulphonate-formaldehyde condensate; and in that (b) there is applied to the soil removed by boring in at least one of the excavation chamber and the conveyor a second aqueous solution containing essentially a high molecular weight polyethylene oxide and optionally a sulphate- or sulphonate-containing anionic surfactant. The process allows easy removal of soil from the cutting head to the excavation chamber and from the excavation chamber out of the machine. It is particularly effective for sticky soils with high proportions of clay and high water content.

11 Claims, No Drawings

TUNNEL BORING WITH FOAMED COMPOSITION

This invention relates to tunnel boring and-to-compositions for use therein.

Earth-pressure balance shield tunnel boring machines (EPBS) are increasingly frequently used in the boring of tunnels in non-rock strata, because they offer many advantages, such as the ability to bore in a wide variety of strata. An EPBS comprises a circular rotatable cutting head mounted on a cylindrical shield of similar diameter such that its axis of rotation coincides with the longitudinal axis of the shield. Within the shield there are contained means for feeding materials to the cutting head and means for conveying away the soil. The soil thus passes through apertures in the cutting head to an excavation chamber immediately behind the cutting head, from which it is then removed by conveyor, generally a screw-type conveyor.

EPBS perform especially well in cohesive soils with good plastic properties, but they are not so efficient in others, for example in thick and sticky soils. One solution to this problem was the addition at the cutting head of a foamed aqueous material, which makes soil removal much easier. An example of such a process can be found in PCT published application WO 99/18330.

Ideally, the soil at the cutting head should be rendered sufficiently plastic by injection of a foamed material, such that it passes through the cutting head into the excavation chamber. At this point, it should be suitable for disposal by conveyor, but this is not always the case. For example, a problem encountered with soil from strata with a high proportion of clay and water is that the soil remains very fluid, and this not only makes efficient removal from the excavation chamber difficult, but also results in soil flowing out of the excavation chamber behind the shield.

It has now been found that it is possible to remove such soil efficiently by using a modified process involving a foaming agent. The invention therefore provides a process of boring a tunnel using an earth-pressure balance shield boring tunnelling machine having a cutting head, an excavation chamber for soil removed by boring and conveying means for removal of said soil from the excavation chamber; wherein there is injected into a stratum being bored at the cutting head a foamed aqueous solution, characterised in that (a) the aqueous solution contains two essential components which are (i) a sulphate- or sulphonate-containing anionic surfactant, and (ii) β-naphthalene sulphonate-formaldehyde condensate; and in that (b) there is applied to the soil removed by boring in at least one of the excavation chamber and the conveyor a second aqueous solution containing essentially a high molecular weight polyethylene oxide and optionally a sulphate- or sulphonate-containing anionic surfactant.

The aqueous solution described at (a) above shall hereinafter be referred to as "the first aqueous solution".

The invention is based on the discovery that, in the conditions of tunnelling, the β-naphthalene sulfonate-formaldehyde condensate (hereinafter referred to by its well-known abbreviation "BNS") and the polyethylene glycol interact in a way whose precise nature is not known but which results in a stiffening of the medium in which they occur together. As a result, the soil containing both becomes less fluid and more suitable for removal by conveyor.

The anionic surfactant, which is an essential component in the first aqueous solution and an optional component in the second aqueous solution, may be selected from any such sulphate- or sulphonate-containing surfactant known to the art. One particularly preferred type is polyalkylene alkyl ether sulphate, where the polyalkylene oxide chain has an average chain length of 2–3 alkylene oxide units. Typical commercial materials include the "Alscope" (trade mark) series of Toho Chemical Industry Co.

Other particularly preferred types include monoisopropanol ammonium lauryl alcohol sulphate (commercially available as, for example, "Sulfetal" (trade mark) Cjot 160, α-olefin sulphonate (CAS Registry Number 68439-57-6), commercially available as, for example, "Rhodocal" (trade mark) A-246-L, and $C_{8-22}$ fatty alcohol sulphate salts and $C_{8-22}$ fatty alcohol ether sulphate salts, the fatty alcohol preferably being lauryl alcohol, the ether being an ether formed with a alkylene oxide (preferably ethylene oxide) chain of from 1–3 alkylene oxide units, and the salt-forming cation being preferably selected from alkali metal, magnesium and alkanolamine.

The BNS useful in this invention may be selected from any of the wide range of such materials commercially available. BNS is used in large quantities in the construction industry as a so-called "superplasticiser" for concrete. Examples of commercially—available materials include RHEOBUILD (trade mark) 1100 and RHEOBUILD 5500.

Polyethylene oxides (PEO) are well-known items of commerce and a suitable material may be selected from the wide range available. Typical examples are the "Polyox" (trade mark) materials of Union Carbide. "By high molecular weight" is meant a material with a weight-average molecular weight of from 100,000–8,000,000. The preferred molecular range is from 2,000,000–5,000,000.

In addition to these two essential components, there can be added to the first aqueous solution other materials known to the art to be useful for performing specific specialised functions, for example, biocides and complexing agents. In some circumstances, foam stabilisers, typically amines with long fatty acid chains, may also be useful. These additional materials may be used in art-recognised quantities. When a polyalkylene alkyl ether sulphate surfactant is used, a useful adjunct material is urea, added to the extent of 0.03–0.8%, preferably 0.06–0.25% by weight of the foamed solution.

In the preparation of the first aqueous solution (for foaming and addition at the cutting head) the percentage ratio (solids by weight) of surfactant to BNS may vary from 1:99–99:1, more preferably 90:10–10:90, most preferably 70:30–30:70. (It is of course possible to add the two essential components independently in different aqueous solutions, but this merely increases the handling problems with no increase in performance). For most convenient handling, the two components are dissolved in water to form a concentrate suitable for further dilution, foaming and injection. Typically, the concentrate will comprise from 5–40%, preferably from 8–20%, by weight solids of surfactant plus condensate. For injection at the cutting head, this concentrate is diluted with water such that it constitutes from 1–20%, preferably from 2–6% by weight of the final first aqueous solution, and it is then foamed by conventional means to give a foam having from 2–15 times, preferably 8–12 times, the volume of the first aqueous solution prior to foaming. The volume of foam injected is from 10–1000 L, preferably 200–600 L, per cubic meter of soil.

The invention additionally provides a foamable liquid concentrate as hereinabove defined.

The invention additionally provides a foam as hereinabove defined.

In the preparation of the second aqueous solution, the polyethylene oxide is dissolved in water to the extent of from 0.5–2.0%, preferably 0.8–1.2%, by weight. If sulphate- or sulphonate-containing anionic surfactant is used in the second aqueous solution, it is present to the extent of from 5–40%, preferably from 8–20% by weight of the second solution. The presence of sulphate- or sulphonate-containing anionic surfactant can assist in the removal of soil from the excavation chamber. When surfactant is present in the second aqueous solution, the solution is foamed by conventional means prior to addition to the excavation chamber and/or the conveyor.

In addition to the essential polyethylene oxide and optional anionic surfactant, the second aqueous solution can also contain art-recognised materials in known quantities to perform specific functions. Examples include biocides and defoamers.

In use, the first aqueous solution is foamed by conventional means and then injected from ports in the cutting head into the stratum being bored. The soil is removed through ports in the cutting head into the excavation chamber. To the contents of the excavation chamber is added the second aqueous solution, foamed if it contains an anionic sulphate- or sulphonate-containing surfactant. It is then taken by conveyor out of the excavation chamber for disposal. As previously mentioned, in addition to or instead of addition of the second aqueous solution to the contents of the excavation chamber, the second aqueous solution may be added at the conveyor.

The process of this invention has been found to be very useful in the handling of soils which contain a high proportion of clay and water. As an example is the soil under Singapore, where the boring of tunnels for an underground railway has proven difficult with known techniques. The process of the present invention works well with such soils, allowing an efficient and economical boring and disposal process.

The invention additionally provides the use of a foam as hereinabove defined in combination with a second aqueous solution as hereinabove defined in the boring of a tunnel using an earth-balanced shield tunnel boring machine.

The invention is further illustrated by the following non-limiting examples.

EXAMPLE 1

An example illustrating the effect of the invention.

Samples of soil taken from the site of the Singapore Metro construction (a heavy, watery clay) are subjected to the cone penetration test of British Standard BS 1377 Part 2, a test which gives an indication of the plasticity or fluidity of the material under test—the deeper the penetration of the cone, the more plastic or fluid the sample. The three samples (Samples 1,2 and 3) are treated as follows:

Sample 1: no treatment.
Sample 2: there is mixed into the soil 0.08% by weight of soil of an anionic surfactant ("Sulfetal" (trade mark) Cjot 160) and 0.04% of BNS ("Rheobuild" (trade mark) 5500).
Sample 3: as Sample 2, but with the further addition of 0.01% of polyethylene oxide ("Polyox" (trade mark) WSR-301).

The cone penetration tests give the following results:
Sample 1: 13.7 mm, Sample 2: 20.7 mm, Sample 3: 17.5 mm In practical terms, Sample 1 is quite stiff. Addition of the two additives to Sample 2 causes the sample to become quite fluid and easy-flowing. Addition of the polyethylene oxide in Sample 3 causes that sample to become stiff again, but not so stiff as the original.

EXAMPLE 2

An example of the use of a foamed composition.

Again, three samples are tested, this time by the spreading test of German Standard DIN 18 555. This test involves placing a sample on a table which is then dropped and impacted. The spread of the sample after impact is a measure of the fluidity of the sample—the bigger the spread the more fluid the sample. The three samples were treated as follows, prior to dropping:

Sample 1: no treatment.
Sample 2: treated with a foamed aqueous mixture of α-olefin sulphonate surfactant ("Rhodocal" (trade mark) A-246-L) and BNS ("Rheobuild" 5500), such that there is added to the soil 0.08% by weight of surfactant and 0.04% BNS.
Sample 3: as Sample 2, with the further addition of 0.01% by weight of polyethylene oxide ("Polyox" WSR-301).

The results are as follows:
Sample 1:10.2 cm., Sample 2:15 cm., Sample 3: 12.2 cm.

As in Example 1, the addition of surfactant and BNS renders the sample more fluid and the further addition of polyethylene oxide stiffens the material again, but not to the same stiffness as the original.

On site, this means that the material at the cutting head of a tunnel boring machine can be made fluid, so that it can pass more easily through the cutting head to the excavation chamber, and it can then be stiffened to enhance removal from the chamber.

What is claimed is:

1. An aqueous foam which is the foamed product of a liquid comprising 1–20% by weight of a foamable liquid concentrate for boring a tunnel consisting essentially of water in which is dissolved a sulphate- or sulphonate-containing anionic surfactant and a β-naphthalene sulphonate-formaldehyde condensate, the solids weight percentage ratio of surfactant to condensate in the concentrate being from 99:1–1:99 and the concentrate containing from 5–40% by weight of surfactant plus condensate and water wherein the volume of the aqueous foam is from 8–12 times that of the volume of the liquid.

2. A process of boring a tunnel using an earth-pressure balance shield boring tunneling machine having a cutting head, an excavation chamber for soil removed by boring and conveying means for removal of said soil from the excavation chamber; wherein there is injected into a stratum being bored at the cutting head a foamed aqueous solution which comprises of a first aqueous solution which is a foamable liquid concentrate for boring a tunnel consisting essentially of water in which is dissolved a sulphate- or sulphonate-containing anionic surfactant and a β-naphthalene sulphonate-formaldehyde condensate, the solids weight percentage ratio of surfactant to condensate in the concentrate being from 99:1–1:99 and the concentrate containing from 5–40% by weight of surfactant plus condensate and there is applied to the soil removed by boring in at least one of the excavation chamber and the conveyor a second aqueous solution containing essentially a high molecular weight polyethylene oxide and optionally a sulphate- or sulphonate-containing anionic surfactant.

3. The process of claim 2, wherein the anionic surfactant of the foamable aqueous concentrate is selected from poly-alkylene alkyl ether sulphate with a polyalkylene oxide average chain length of from 2–3 alkylene oxide units, monoisopropanol ammonium lauryl alcohol sulphate, α-olefin sulphonates and $C_{8-22}$ fatty alcohol sulphate salts and $C_{8-22}$ fatty alcohol ether sulphate salts, the ether being an ether formed with a alkylene oxide chain of from 1–3 aikylene oxide units.

4. A process according to claim 2, wherein the polyethylene oxide in the second aqueous solution has a weight-average molecular weight of from 100,000–8,000,000.

5. A process according to claim 4, wherein the polyethylene oxide in the second aqueous solution has a weight-average molecular weight of from 2,000,000–5,000,000.

6. The process of claim 2, wherein the foamable liquid concentrate has a solids weight percentage ratio of the sulphate- or sulphonate-containing anionic surfactant to the β-naphthalene sulphonate-formaldehyde condensate in the first aqueous solution is from 90:10–10:90.

7. The process of claim 6, wherein the foamable liquid concentrate has a solids weight percentage ratio of the sulphate or sulphonate-containing anionic surfactant to the β-naphthalene sulphonate-formaldehyde condensate in the first aqueous solution is from 70:30–30:70.

8. The process of claim 2, wherein the foamable aqueous concentrate contains from 5–40% by weight anionic surfactant and β-naphthalene sulphonate-formaldehyde condensate and is subsequently diluted such that it constitutes 1–20% of the first aqueous solution and wherein the first aqueous solution is foamed to give a volume of foam which is from 2–15 times the volume of the first aqueous solution prior to foaming.

9. The process of claim 2, wherein the volume of foamed aqueous solution injected is from 10–1000 L per cubic meter of soil.

10. The process of claim 9, wherein the volume of foamed aqueous solution injected is Tram 200–600 L per cubic meter of soil.

11. The process of claim 8, wherein the first aqueous solution is foamed to give a volume of foam which is from 8–12 times the volume of the fist aqueous solution prior to foaming.

* * * * *